US008771141B2

(12) United States Patent
Aoyama et al.

(10) Patent No.: US 8,771,141 B2
(45) Date of Patent: Jul. 8, 2014

(54) COAST STOP VEHICLE AND COAST STOP METHOD

(75) Inventors: Noritaka Aoyama, Yokohama (JP); Naohiro Yamada, Atsugi (JP); Keichi Tatewaki, Atsugi (JP); Shinichiro Watanabe, Yokohama (JP)

(73) Assignee: Jatco Ltd, Fuji-shi (JP)

( * ) Notice: Subject to any disclaimer, the term of this patent is extended or adjusted under 35 U.S.C. 154(b) by 380 days.

(21) Appl. No.: 13/251,558

(22) Filed: Oct. 3, 2011

(65) Prior Publication Data

US 2012/0088629 A1 Apr. 12, 2012

(30) Foreign Application Priority Data

Oct. 6, 2010 (JP) ................................ 2010-227021

(51) Int. Cl.
*F16H 61/662* (2006.01)

(52) U.S. Cl.
USPC .......................................................... 477/45

(58) Field of Classification Search
None
See application file for complete search history.

(56) References Cited

U.S. PATENT DOCUMENTS 6,881,170 B2 * 4/2005 Onoyama et al. ............... 477/39

FOREIGN PATENT DOCUMENTS

| JP | 2005-233252 A | 9/2005 |
|---|---|---|
| JP | 2006-170295 A | 6/2006 |

* cited by examiner

*Primary Examiner* — Erin D Bishop
(74) *Attorney, Agent, or Firm* — Foley & Lardner LLP

(57) ABSTRACT

A coast stop vehicle includes a variator which continuously changes a speed ratio by changing a winding diameter of a belt mounted on pulleys, a sub-transmission mechanism connected in series with the variator and shifting discrete gear positions by changing engaged states of a plurality of frictional engagement elements, and a coast stop unit which stops the rotation of the drive power source and releases the engaged frictional engagement element when the coast stop condition holds during travel. The coast stop unit includes a coast stop prohibiting unit which prohibits the coast stop regardless of the coast stop condition when it is predicted at the time of determining whether or not the coast stop condition holds that a belt tightening force of the pulley falls below an engaging force of the frictional engagement element in the engaged state by the execution of the coast stop.

11 Claims, 10 Drawing Sheets

START
S101
COAST STOP CONDITION HOLD ?
No
Yes
S102
IT IS PREDICTED THAT BELT TIGHTENING FORCE OF PULLEYS FALL BELOW CLUTCH ENGAGING FORCE ?
Yes
No
S103
EXECUTE COAST STOP
RETURN

COAST STOP VEHICLE AND COAST STOP METHOD

TECHNICAL FIELD OF THE INVENTION

The present invention provides a coast stop vehicle which can stop a drive power source during travel and prevents belt slip.

BACKGROUND OF THE INVENTION

An idle stop control is known which stops an engine as a drive power source in a stopped state of a vehicle. Further, a vehicle (see JP2006-170295A) is known which stops an engine also during travel. Engine fuel economy can be improved by such a control.

SUMMARY OF THE INVENTION

A continuously variable transmission is developed which enlarges a shift area by combining a variator capable of continuously shifting a speed ratio and a sub-transmission mechanism having stepped gear positions. If a control to stop an engine during travel (hereinafter, referred to as coast stop) is executed in this continuously variable transmission as described above, the following situation may occur.

If the rotation of an oil pump connected to a rotary shaft of the engine is also reduced by the stop of the engine, a line pressure supplied by the oil pump is reduced.

A belt tightening force of the variator and an engaging force of a frictional engagement element of the sub-transmission mechanism are controlled by the line pressure supplied by the oil pump. If this line pressure is reduced, the engaging force of the frictional engagement element could exceed the belt tightening force and a belt slipping problem could occur in the case of a hydraulic circuit in which an accumulator is arranged in an oil passage for the frictional engagement element or in the case of such a hydraulic circuit as to supply the line pressure to the frictional engagement element due to the occurrence of a failure to cut off an electrically conductive state of a solenoid for controlling a hydraulic pressure to the frictional engagement element.

The present invention was developed in view of such a problem and aims to provide a coast stop vehicle which can stop an engine as a drive power source during travel and prevents a trouble such as slip of a belt due to an engaging force of a frictional engagement element exceeding a belt tightening force caused by the stop of the engine.

A coast stop vehicle according to an aspect of this invention for stopping a drive power source during the travel of the vehicle includes an oil pump which produces a line pressure in an oil passage by the rotation of the drive power source, a variator which continuously changes a speed ratio by changing a winding diameter of a belt mounted on pulleys using the line pressure, a sub-transmission mechanism connected in series with the variator and shifting stepped gear positions by changing engaged states of a plurality of frictional engagement elements using the line pressure, and a coast stop unit which determines whether or not a coast stop condition holds during the travel of the vehicle and executing a coast stop to stop the rotation of the drive power source when the coast stop condition holds. The coast stop unit includes a coast stop prohibiting unit which prohibits the coast stop regardless of whether or not the coast stop condition holds when it is predicted at the time of deter mining whether or not the coast stop condition holds that a belt tightening force of the pulley falls below an engaging force of the frictional engagement element in the engaged state by the execution of the coast stop.

A coast stop method according to another aspect of this invention is used to control a coast stop vehicle for stopping a drive power source during the travel of the vehicle. The coast stop vehicle includes an oil pump which produces a line pressure by the rotation of the drive power source, a variator which continuously changes a speed ratio by changing a winding diameter of a belt mounted on a pair of pulleys using the line pressure, and a sub-transmission mechanism connected in series with the variator and shifting stepped gear positions by changing engaged states of a plurality of frictional engagement elements using the line pressure. The coast stop method includes determining whether or not a coast stop condition holds during the travel of the vehicle, executing a coast stop by stopping the rotation of the drive power source and releasing the engaged frictional engagement element when the coast stop condition holds, and prohibiting the coast stop regardless of whether or not the coast stop condition holds when it is predicted that a belt tightening force of the pulleys falls below an engaging force of the frictional engagement element by the execution of the coast stop.

According to the present invention, even if the coast stop condition holds during the travel of the vehicle, the stop of the rotation of the drive power source is prohibited in a situation where the belt tightening force of the pulley is predicted to fall below the engaging force of the frictional engagement element in the engaged state by the execution of the coast stop. Thus, a trouble which occurs when the belt tightening force of the pulley falls below the engaging force of the frictional engagement element in the engaged state and the belt slips can be prevented beforehand.

DESCRIPTION OF THE PREFERRED EMBODIMENTS

First Embodiment

Hereinafter, embodiments of the present invention are described with reference to the accompanying drawings. In the following description, a "speed ratio" of a certain transmission mechanism is a value obtained by dividing an input rotation speed of this transmission mechanism by an output rotation speed thereof. Further, a "lowest speed ratio" is a maximum speed ratio of the transmission mechanism and a "highest speed ratio" is a minimum speed ratio thereof.

Figure 1:
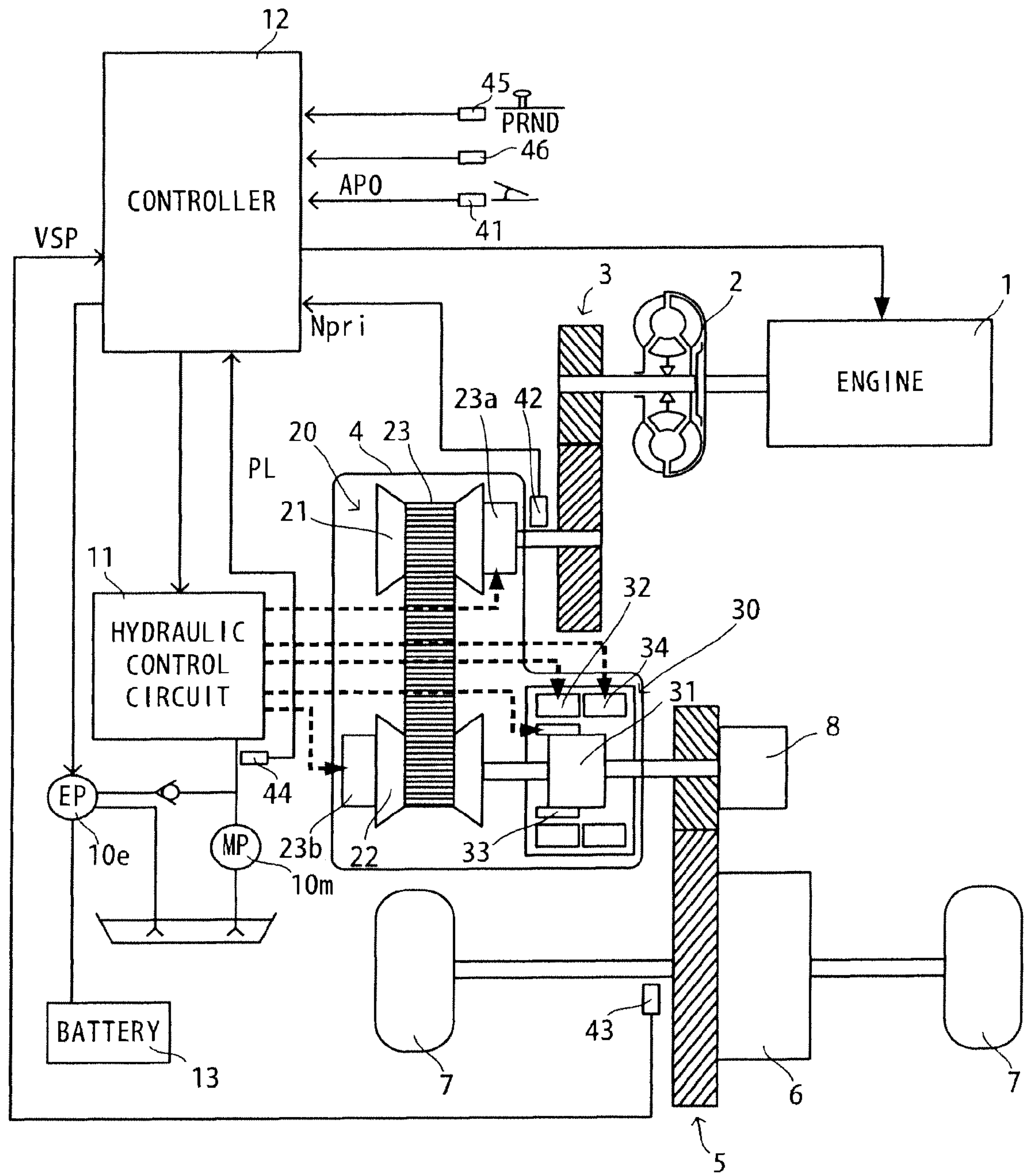
FIG. 1 is a schematic construction diagram of a vehicle including a continuously variable transmission according to a first embodiment of the present invention.

FIG. 1 is a schematic construction diagram of a coast stop vehicle according to an embodiment of the present invention. This vehicle includes an engine 1 as a drive source, and output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final speed reducer 6. The second gear train 5 includes a parking mechanism 8 for mechanically locking an output shaft of the transmission 4 in a parked state so as not to be able to rotate.

The transmission 4 is provided with a mechanical oil pump 10*m* to which the rotation of the engine 1 is input and which is driven by utilizing a part of power of the engine 1 and an electrical oil pump 10*e* which is driven upon receiving the supply of power from a battery 13. The electrical oil pump 10*e* is composed of an oil pump main body, and an electric motor and a motor driver for driving and rotating the oil pump main body and can control a driving load to a desired load or in multiple stages. Further, the transmission 4 includes a hydraulic control circuit 11 for adjusting a hydraulic pressure (hereinafter, referred to as a "line pressure PL") from the mechanical oil pump 10*m* or the electrical oil pump 10*e* and supplying the adjusted hydraulic pressure to the respective components of the transmission 4.

The transmission 4 includes a V-belt continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected to a front side (input shaft side) of the variator 20.

The variator 20 includes a primary pulley 21, a secondary pulley 22 and a V-belt 23 mounted between the pulleys 21 and 22. Each of the pulley 21, 22 includes a fixed conical plate, a movable conical plate arranged with a sheave surface faced toward the fixed conical plate and forming a V-groove between the fixed conical plate and the movable conical plate, and a hydraulic cylinder 23*a*, 23*b* provided on the back surface of the movable conical plate for displacing the movable conical plate in an axial direction. When hydraulic pressures supplied to the hydraulic cylinders 23*a*, 23*b* are adjusted, the widths of the V-grooves change to change contact radii of the V-belt 23 and the respective pulleys 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If hydraulic pressures supplied to the respective frictional engagement elements 32 to 34 are adjusted to change engaged and released states of the respective frictional engagement elements 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The transmission mechanism 30 is set to a second gear position with a gear ratio lower than in the first gear position if the high clutch 33 is engaged and the low brake 32 and the reverse brake 34 are released. The sub-transmission mechanism 30 is set to a reverse gear position if the reverse brake 34 is engaged and the low brake 32 and the high clutch 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

The respective frictional engagement elements are provided before or behind the variator 20 on the power transmission path, and any of them enables power transmission of the transmission 4 when being engaged while disabling power transmission of the transmission 4 when being released.

Figure 2:
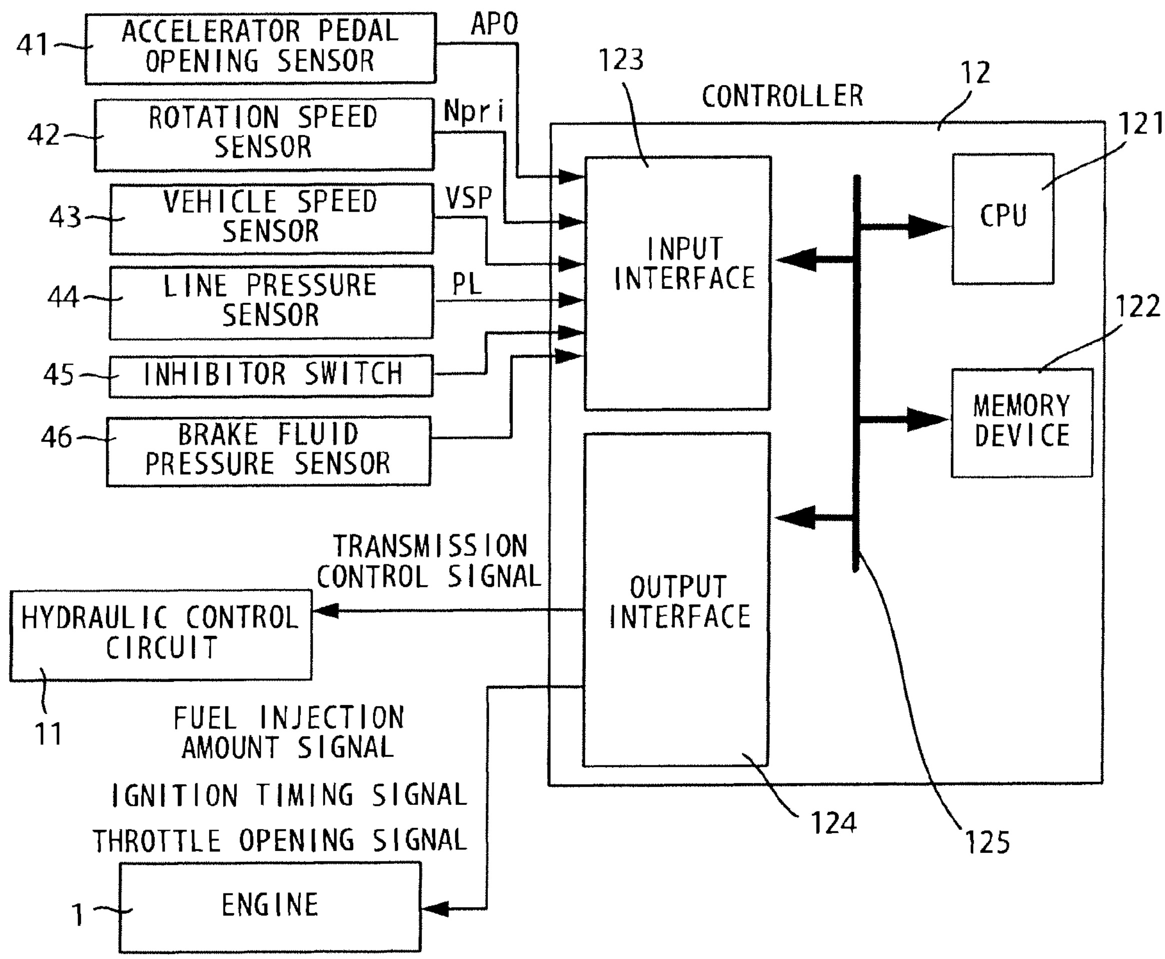
FIG. 2 is a diagram showing an example of the construction of a transmission controller according to the first embodiment of the present invention.

A controller 12 is a controller for controlling the engine 1 and the transmission 4 in a comprehensive manner and includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting an accelerator pedal opening APO which is an operated amount of an accelerator pedal, an output signal of a rotation speed sensor 42 for detecting an input rotation speed of the transmission 4 (=rotation speed of the primary pulley 21, hereinafter, referred to as a "primary rotation speed Npri"), an output signal of a vehicle speed sensor 43 for detecting a vehicle speed VSP, an output signal of a line pressure sensor 44 for detecting the line pressure PL, an output signal of an inhibitor switch 45 for detecting the position of a select lever, an output signal of a brake fluid pressure sensor 46 for detecting a brake fluid pressure, and like output signals.

A control program of the engine 1, a transmission control program of the transmission 4, and various maps/tables used in these programs are stored in the memory device 122. The CPU 121 reads the programs stored in the memory device 122 and implements them, performs various computations on various signals input via the input interface 123 to generate a fuel injection quantity signal, an ignition timing signal, a throttle opening signal, a transmission control signal and a drive signal for the electrical oil pump 10*e* and outputs the generated signals to the engine 1, the hydraulic control circuit 11 and the motor driver of the electrical oil pump 10*e* via the output interface 124. Various values used in the computations by the CPU 121 and computation results are appropriately stored in the memory device 122.

The hydraulic control circuit 11 is composed of a plurality of flow passages and a plurality of hydraulic control valves. In accordance with the transmission control signal from the controller 12, the hydraulic control circuit 11 controls the plurality of hydraulic control valves to switch supply passages of the hydraulic pressures, prepares a necessary hydraulic pressure from a hydraulic pressure produced by the mechanical oil pump 10*m* or the electrical oil pump 10*e*, and supplies this to the respective components of the transmission 4. In this way, the speed ratio of the variator 20 and the gear position of the sub-transmission mechanism 30 are changed to shift the transmission 4.

Figure 3:
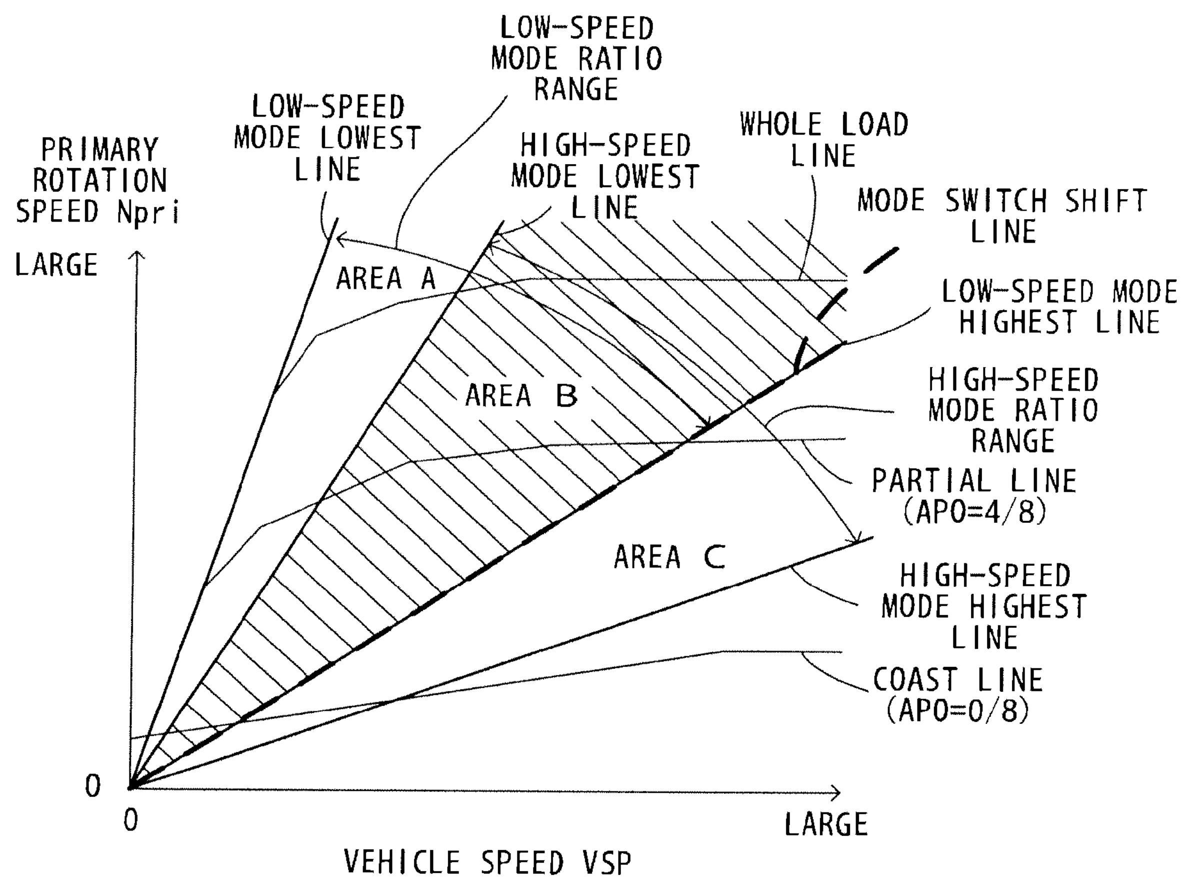
FIG. 3 is a graph showing an example of a shift map according to the first embodiment of the present invention.

FIG. 3 shows an example of a shift map stored in the memory device 122. The controller 12 controls the variator 20 and the sub-transmission mechanism 30 according to a driving condition of the vehicle (in this embodiment, vehicle speed VSP, primary rotation speed Npri, accelerator pedal opening APO) based on this shift map.

In this shift map, an operating point of the transmission 4 is defined by the vehicle speed VSP and the primary rotation speed Npri. The inclination of a line connecting the operating point of the transmission 4 and a zero point at the lower left corner of the shift map corresponds to the speed ratio of the transmission 4 (overall speed ratio obtained by multiplying the speed ratio of the variator 20 by a speed ratio of the sub-transmission mechanism 30, hereinafter, referred to as a "through speed ratio"). In this shift map, a shift line is set for each accelerator pedal opening APO similar to a shift map of a conventional V-belt continuously variable transmission, and the transmission 4 is shifted in accordance with the shift line selected based on the accelerator pedal opening APO. Note that, for simplicity, only a whole load line (shift line when the accelerator pedal opening APO=8/8), a partial line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by setting the speed ratio of the variator 20 to the lowest speed ratio and a low-speed mode highest line obtained by setting the speed ratio of the variator 20 to the highest speed ratio. In this case, the operating point of the transmission 4 moves in areas A and B. On the other hand, when being in the high-speed mode, the transmission 4 can be shifted between a high-speed mode lowest line obtained by setting the speed ratio of the variator 20 to the lowest speed ratio and a high-speed mode highest line obtained by setting the speed ratio of the variator 20 to the highest speed ratio. In this case, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is lower than the speed ratio corresponding to the high-speed mode lowest line (high-speed mode lowest speed ratio). By this, a range of the through speed ratio of the transmission 4 that can be set in the low-speed mode ("low-speed mode ratio range" in FIG. 3) and a range of the through speed ratio of the transmission 4 that can be set in the high-speed mode ("high-speed mode ratio range" in FIG. 3) partly overlap, and the transmission 4 can be selectively set in either one of the low-speed mode and the high-speed mode if the operating point of the transmission 4 is in the area B defined between the high-speed mode lowest line and the low-speed mode highest line.

Further, on this shift map, a mode switch shift line at which the sub-transmission mechanism 30 is shifted is so set as to overlap the low-speed mode highest line. A through speed ratio corresponding to the mode switch shift line (hereinafter, referred to as a "mode switch speed ratio mRatio") is set at a value equal to the low-speed mode highest speed ratio. The mode switch shift line is set in this way because an input torque to the sub-transmission mechanism 30 decreases as the speed ratio of the variator 20 decreases and a shift shock when the sub-transmission mechanism 30 is shifted can be suppressed.

When the operating point of the transmission 4 crosses the mode switch shift line, i.e. an actual value of the through speed ratio (hereinafter, referred to as an "actual through speed ratio Ratio") changes over the mode switch speed ratio mRatio, the controller 12 performs a synchronization shift described below to switch between the high-speed mode and the low-speed mode.

In the synchronization shift, the controller 12 shifts the sub-transmission mechanism 30 and changes the speed ratio of the variator 20 in a direction opposite to a direction in which the speed ratio of the sub-transmission mechanism 30 changes. At this time, an inertial phase in which the speed ratio of the sub-transmission mechanism 30 actually changes and a period during which the speed ratio of the variator 20 changes are synchronized. The speed ratio of the variator 20 is changed in the direction opposite to the changing direction of the speed ratio of the sub-transmission mechanism 30 so that a change in input rotation caused by a difference in the actual through speed ratio Ratio does not give a sense of discomfort to a driver.

Specifically, when the actual through speed ratio Ratio of the transmission 4 changes over the mode switch speed ratio mRatio from the low side to the high side, the controller 12 changes the gear position of the sub-transmission mechanism 30 from the first gear position to the second gear position (1-2 shift) and changes the speed ratio of the variator 20 to the low side.

Conversely, when the actual through speed ratio Ratio of the transmission 4 changes over the mode switch speed ratio mRatio from the high side to the low side, the controller 12 changes the gear position of the sub-transmission mechanism 30 from the second gear position to the first gear position (2-1 shift) and changes the speed ratio of the variator 20 to the high side.

Further, the controller 12 executes a coast stop control described below to suppress fuel consumption amount.

The coast stop control is a control for suppressing the fuel consumption amount by automatically stopping the engine 1 while the vehicle is running in a low speed region (coast stop). This control is common to a fuel cut control executed when the accelerator is off in that fuel supply to the engine 1 is stopped, but differs therefrom in that the lock-up clutch and the frictional engagement element (low brake 32 or high clutch 33) are released to cut off the power transmission path between the engine 1 and the drive wheels 7 and completely stop the rotation of the engine 1.

Upon executing the coast stop control, the controller 12 first judges, for example, conditions a to d listed below.

a: accelerator pedal is not depressed at all (accelerator pedal opening APO=0)

b: brake pedal is depressed (brake fluid pressure is a predetermined value or higher)

c: vehicle speed is a predetermined low speed (e.g. 15 km/h) or lower d: lock-up clutch is released.

These conditions are, in other words, conditions to judge whether or not a driver has an intention to stop the vehicle.

The lock-up clutch is released in the case of crossing a lock-up release line (not shown) set on the shift map from a high speed side or high rotation side to a low speed side or low rotation side. The controller 12 judges that the coast stop condition holds when all of these conditions a to d hold.

In the coast stop, fuel supply to the engine 1 is stopped to automatically stop the engine 1. When the engine 1 stops, the mechanical oil pump 10*m* driven by power of the engine 1 also stops and a discharge pressure thereof becomes zero, whereby the low brake 32 is completely released. The low brake 32 is released substantially simultaneously with the stop of the engine 1 and the mechanical oil pump 10*m*.

When the hydraulic pressures supplied from the mechanical oil pump 10*m* to the hydraulic cylinders 23*a*, 23*b* of the pulleys 21, 22 become zero and the low brake 32 is released to free the variator 20 in a rotational direction, the speed ratio of the variator 20 is changed toward the lowest speed ratio by return springs arranged in the hydraulic cylinders 23*a*, 23*b*.

When the mechanical oil pump 10*m* stops, the drive of the electrical oil pump 10*e* is started and the hydraulic pressure produced by the electrical oil pump 10*e* is supplied to the hydraulic cylinders 23*a*, 23*b* to change the speed ratio of the variator 20 to the lowest speed ratio.

The hydraulic pressure supplied to the hydraulic cylinders 23*a*, 23*b* is only for tightening the belt 23 by the pulleys 21, 22 and not sufficient to transmit power. However, since the low brake 32 is released and the sub-transmission mechanism 30 is in a neutral state, even if a torque is input from the drive wheels 7 such as due to braking, this torque is not transmitted to the variator 20 via the sub-transmission mechanism 30 and slip of the belt 23 is prevented.

After the low brake 32 is released, the controller 12 increases the hydraulic pressure supplied to the low brake 32 to a hydraulic pressure (hereinafter, referred to as a "zero-point hydraulic pressure") at which a clearance between an input-side element and an output-side element of the low brake 32 is zero and a torque capacity (transmittable torque) of the low brake 32 is zero. This is to quickly increase the torque capacity of the low brake 32 and improve re-acceleration responsiveness at the time of re-acceleration by maintaining the low brake 32 in a state immediately before engagement during the coast stop.

Note that judgment as to whether or not the above conditions a to d hold is continued also during the coast stop. If even one of them no longer holds, the coast stop condition does not hold and the controller 12 resumes fuel supply to the engine 1 to restart the engine 1 and stops the electrical pump 10*e* when the mechanical pump 10*m* comes to generate a sufficient hydraulic pressure.

Figure 4:
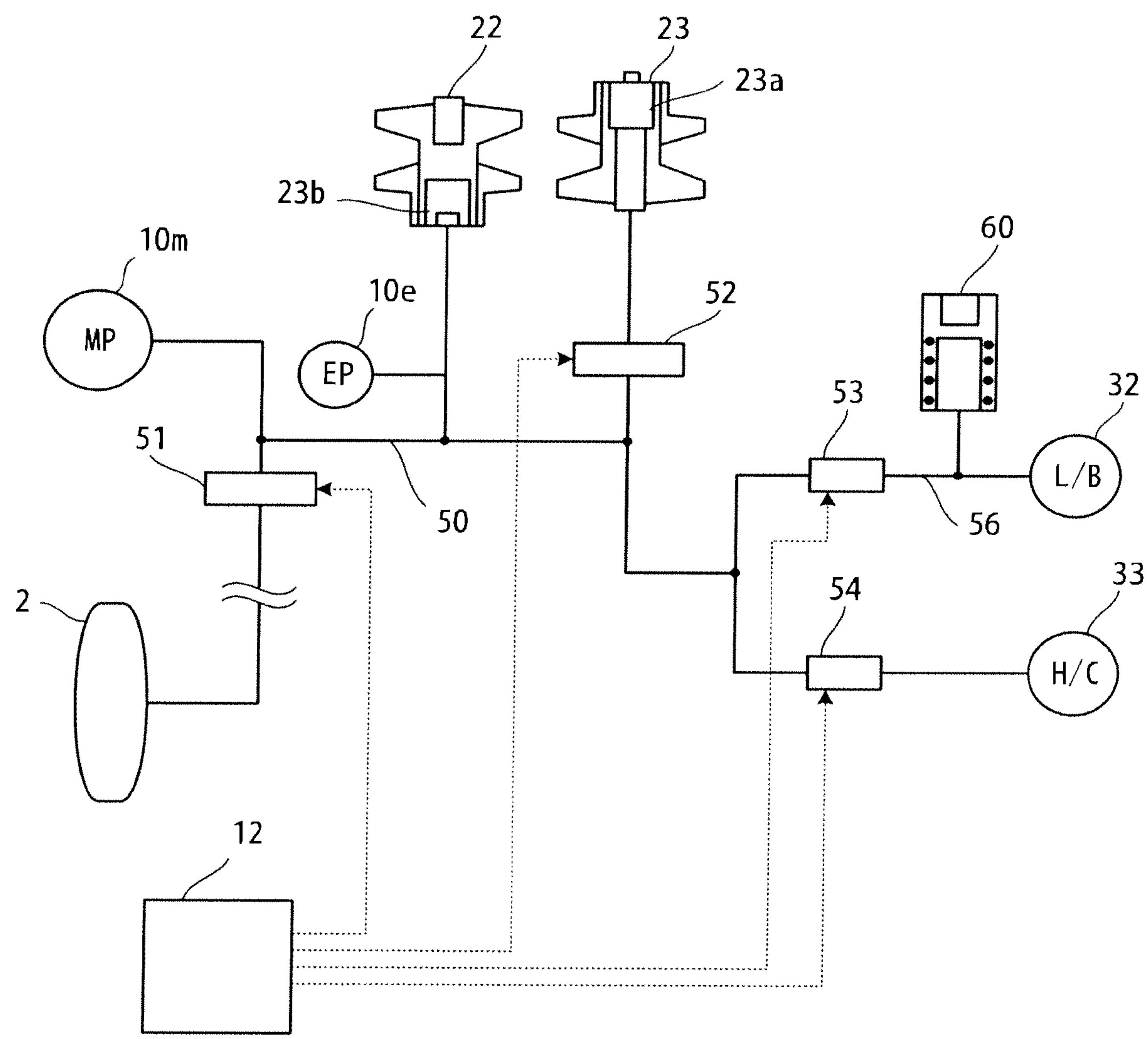
FIG. 4 is a diagram showing a hydraulic control circuit according to the first embodiment of the present invention.

FIG. 4 is a diagram showing the construction of the hydraulic control circuit 11 of this embodiment.

The hydraulic control circuit 11 includes the mechanical oil pump 10*m* driven by the drive power of the engine 1. The hydraulic pressure produced by the mechanical oil pump 10*m* is adjusted to a predetermined line pressure by a pressure regulator valve 51 and distributed to the respective components of the variator 20 and the sub-transmission mechanism 30 via an oil passage 50.

Further, the hydraulic pressure produced by the mechanical oil pump 10*m* is supplied to the torque converter 2 via the pressure regulator valve 51. This hydraulic pressure is used for torque transmission and engagement and release of the lock-up clutch.

The line pressure in the oil passage 50 is supplied to an oil chamber of the hydraulic cylinder 23*b* of the secondary pulley 22. Further, the line pressure in the oil passage 50 is reduced by a pressure reducing valve 52 and supplied to an oil chamber of the hydraulic cylinder 23*a* of the primary pulley 21. By adjusting the hydraulic pressure supplied to the oil chamber of the hydraulic cylinder 23*a* by the pressure reducing valve 52, the widths of the respective V-grooves change due to a difference from the line pressure supplied to the oil chamber of the hydraulic cylinder 23*b*, thereby changing contact radii of the V-belt 23 and the pulleys and continuously changing the speed ratio of the variator 20.

Further, the line pressure in the oil passage 50 is supplied to the low brake 32 via a pressure reducing valve 53 and to the high clutch 33 via a pressure reducing valve 54 respectively in the sub-transmission mechanism 30. The pressure reducing valve 53 controls an engaging force of the low brake 32 by adjusting the hydraulic pressure supplied to the low brake 32. The pressure reducing valve 54 controls an engaging force of the high clutch 33 by adjusting the hydraulic pressure supplied to the high clutch 33.

An accumulator 60 is connected to an oil passage 56 between the pressure reducing valve 53 and the low brake 32. The accumulator 60 stores hydraulic oil inside and eases a change in the hydraulic pressure in the oil passage 56 by this hydraulic oil.

Specifically, when the hydraulic pressure is a predetermined pressure or higher, the hydraulic oil is stored in the accumulator 60. If the hydraulic pressure falls below the predetermined pressure, the hydraulic oil stored in the accumulator 60 is supplied to the oil passage 56 to delay a response to a reduction in the hydraulic pressure in the oil passage 56. Further, when the hydraulic pressure in the oil passage 56 increases from a low state, the hydraulic oil is stored in the accumulator 60 to delay a response to an increase in the hydraulic pressure in the oil passage 56. Since responsiveness of the hydraulic pressure in the oil passage 56 is delayed in this way to suppress sudden increase and decrease of the hydraulic pressure, a shock at the time of engaging and releasing the low brake 32 can be suppressed.

The controller 12 adjusts the line pressure by controlling the pressure regulator valve 51. The controller 12 also controls the speed ratio of the variator 20 by controlling the pressure reducing valve 52 to adjust the hydraulic pressure to the hydraulic cylinder 23*a* of the primary pulley 21. The controller 12 further controls the engaged state of the low brake 32 by controlling the pressure reducing valve 53. The controller 12 furthermore controls the engaged state of the high clutch 33 by controlling the pressure reducing valve 54.

The mechanical oil pump 10*m* is driven by the rotation of the engine 1. The mechanical oil pump 10*m* constantly rotates to produce a hydraulic pressure necessary for the operation of the transmission 4 while the engine 1 is rotating. Since the transmission 4 requires a hydraulic pressure in preparation for the start of the vehicle even in a stopped state of the vehicle, the line pressure is produced by driving the mechanical oil pump 10*m* in a state where the engine 1 is rotating in the stopped state of the vehicle.

On the other hand, when the rotation of the engine 1 is stopped such as due to the coast stop, the drive of the mechanical oil pump 10*m* stops to reduce the hydraulic pressure. In preparation for this, the electrical oil pump 10*e* is provided in the oil passage 50.

The electrical oil pump 10*e* is driven by the supply of power from the battery 13 to produce a hydraulic pressure by the control of the controller 12 in order to supply the hydraulic pressure to the transmission 4 when the rotation of the engine 1 is stopped and the mechanical oil pump 10*m* is not operating.

Note that the electrical oil pump 10*e* operates at the time of a relatively low load such as during an idle stop or coast stop. Accordingly, the electrical oil pump 10*e* preferably has a capacity which is sufficient to provide a necessary hydraulic pressure in such a driving condition and does not lead to an increase in the weight of the vehicle and a cost increase.

Next, operations at the time of the coast stop by the controller 12 are described.

Figure 5:
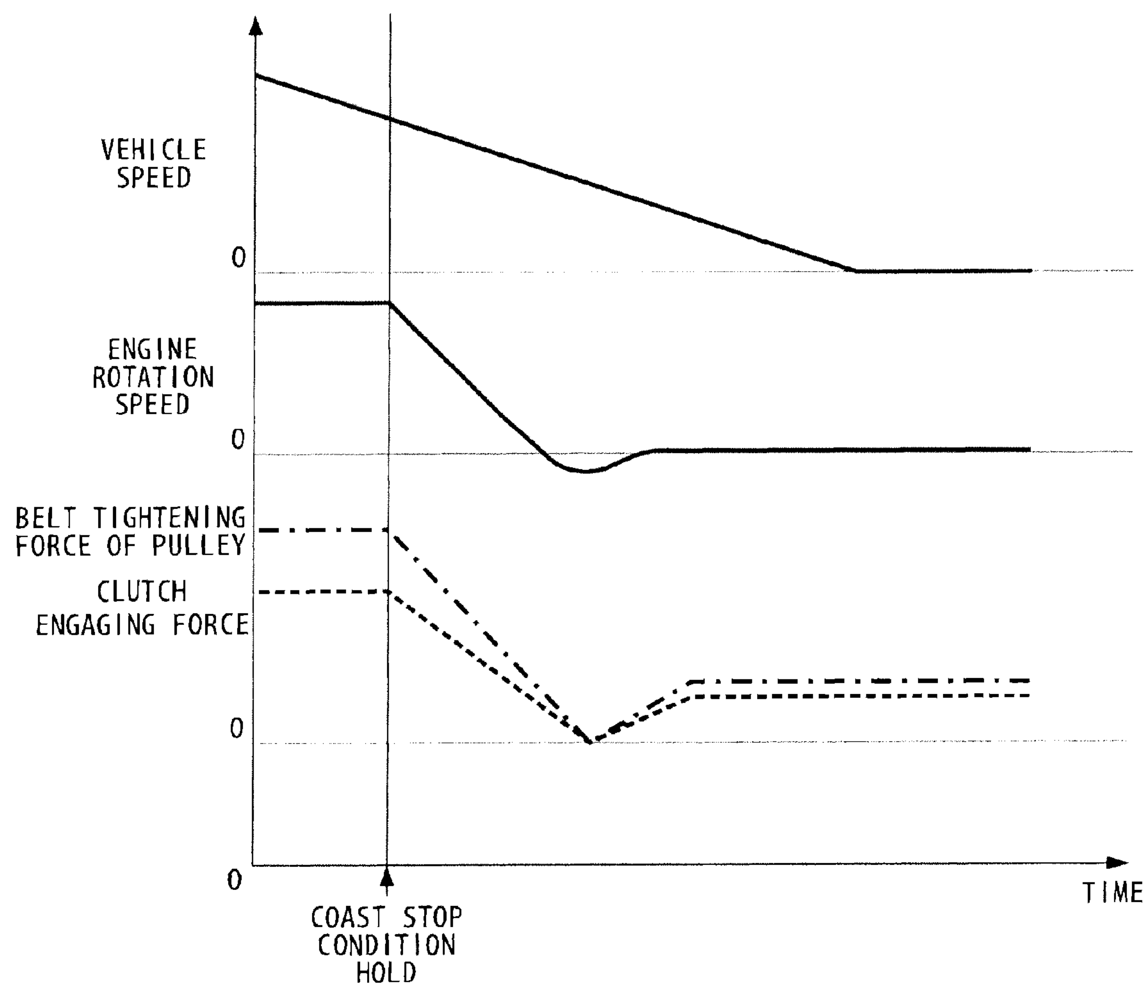
FIG. 5 is a graph showing states of a variator and a sub-transmission mechanism at the time of a coast stop according to the first embodiment of the present invention.

FIG. 5 is a graph showing states of the variator 20 and the sub-transmission mechanism 30 at the time of the coast stop according to this embodiment.

As described above, the controller 12 stops the engine 1 and executes the coast stop when the coast stop condition holds.

When the coast stop is executed, the rotational speed of the engine 1 is gradually reduced and, then, becomes zero. This causes the rotation of the mechanical oil pump 10*m* driven by the engine 1 to be also gradually reduced and causes the hydraulic pressure produced by the mechanical oil pump 10*m* to be also gradually reduced. Note that, since the hydraulic pressure supplied from the mechanical oil pump 10*m* to the oil passage 50 is not immediately reduced in this case, the line pressure necessary to engage the frictional engagement element of the transmission 4 and tighten the V-belt 23 of the variator 20 can be ensured for a while.

The controller 12 executes the coast stop and actuates the electrical oil pump 10*e*. In this way, the line pressure in the hydraulic control circuit 11 is produced by the electrical oil pump 10*e* instead of the mechanical oil pump 10*m*. In the transmission 4, the engaging pressures of the frictional engagement elements of the sub-transmission mechanism 30 and the tightening pressure of the V-belt 23 of the variator 20 are controlled using the line pressure produced by the electrical oil pump 10*e* as a source pressure. The release of the engaged frictional engagement element is controlled by this line pressure.

Note that the engine 1 may be rotated in a reverse direction by a compressive reaction force of a cylinder immediately before the rotation of the engine 1 is stopped by the coast stop. This causes the mechanical oil pump 10*m*, which is directly connected to the rotary shaft of the engine 1 and rotating, to be rotated in the reverse direction, whereby a negative hydraulic pressure is produced at a discharge side and the line pressure is temporarily and transiently reduced to the vicinity of zero. After the rotation of the engine 1 completely stops thereafter, the hydraulic pressure produced by the electrical oil pump 10*e* is supplied as the line pressure. Note that the engine 1 is not necessarily rotated in the reverse direction at the time of the coast stop.

Although the tightening force of the V-belt 23 by the respective pulleys and the engaging forces of the frictional engagement elements are maintained by the line pressure in the variator 20 and the sub-transmission mechanism 30, these are reduced as the line pressure decreases. Note that, in this embodiment, the force for tightening the V-belt 23 by the primary pulley 21 and the secondary pulley 22 is called a belt tightening force of the pulleys (shown by dotted line). Further, a force produced in the frictional engagement element by supplying the hydraulic pressure to the presently engaged frictional engagement element (low brake 32 or high clutch 33) in the sub-transmission mechanism 30 is called a clutch engaging force (shown by dashed-dotted line).

Normally, the frictional engagement element is engaged/released while slipping when the sub-transmission mechanism 30 is shifted. On the other hand, if the rotating V-belt 23 of the variator 20 slips, there is a possibility of scratching the sheave surface of the primary pulley 21 or the secondary pulley 22 or deteriorating the sheave surface or the V-belt 23. Thus, it is required that the V-belt 23 does not slip.

By the execution of the coast stop, the line pressure is reduced and the belt tightening force of the pulleys and the clutch engaging force are reduced. At this time, since the belt tightening force of the pulleys is more than the clutch engaging force before the execution of the coast stop, the belt tightening force of the pulleys and the clutch engaging force are reduced after the execution of the coast stop while the belt tightening force of the pulleys is maintained to be more than the clutch engaging force. Accordingly, the frictional engagement element is released earlier and no drive power is input to the variator 20 from the drive wheels, wherefore the V-belt 23 does not slip.

Figure 6:
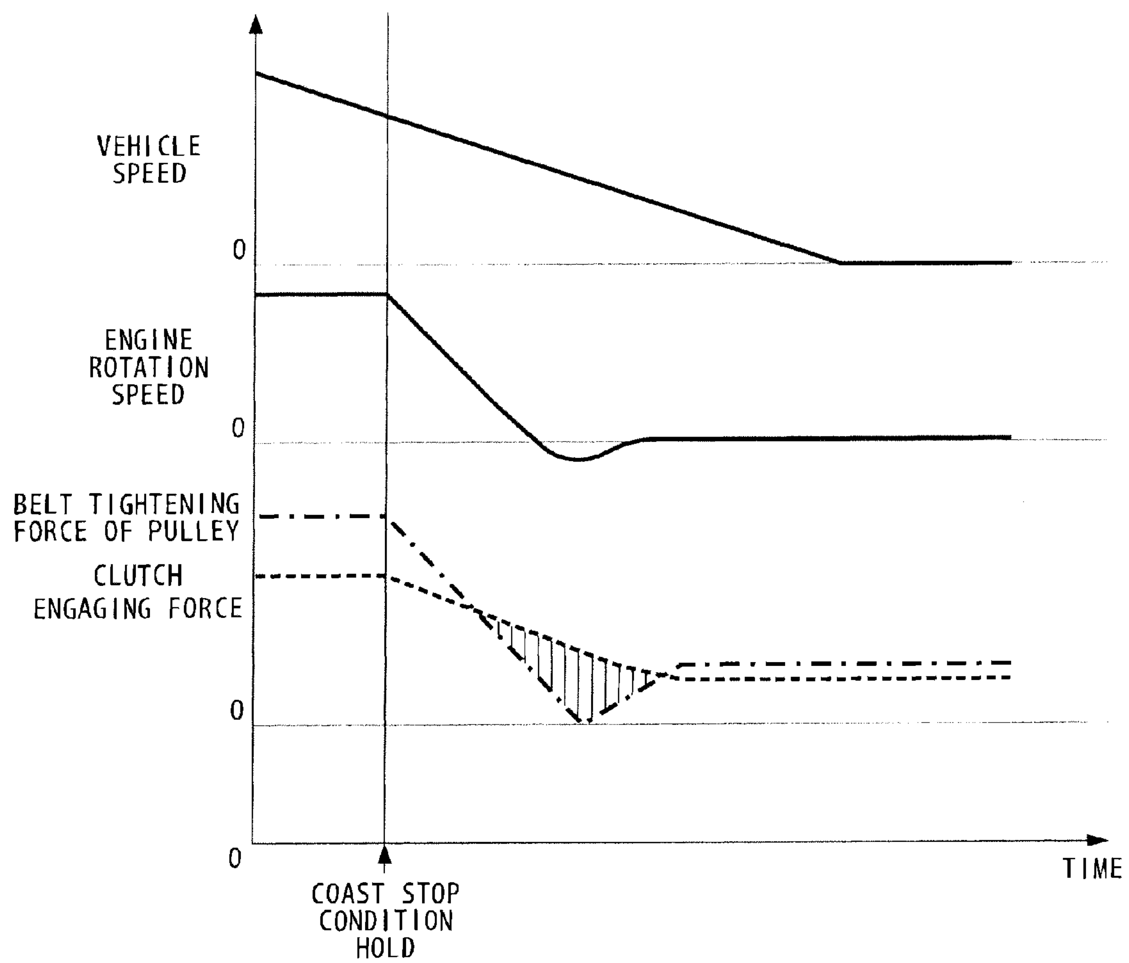
FIG. 6 is a graph showing states of the variator and the sub-transmission mechanism at the time of the coast stop according to the first embodiment of the present invention.

FIG. 6 is a graph showing an example of states of the variator 20 and the sub-transmission mechanism 30 at the time of the coast stop in this embodiment.

As described above with reference to FIG. 5, the coast stop is executed and the rotational speed of the engine 1 is reduced to reduce the discharge pressure of the mechanical oil pump 10*m* and also reduce the line pressure. This causes the belt tightening force of the pulleys and the clutch engaging force to be respectively reduced.

The controller 12 releases the engaged low brake 32 during the execution of the coast stop. At this time, since the accumulator 60 is provided in the oil passage 56 for supplying the hydraulic pressure to the low brake 32, responsiveness to a reduction in the hydraulic pressure supplied to the low brake 32 is delayed by the hydraulic pressure stored in the accumulator 60.

Thus, there is a possibility that the belt tightening force of the pulleys is more quickly reduced than the clutch engaging force and falls below the clutch engaging force to cause slip of the V-belt 23.

Figure 7:
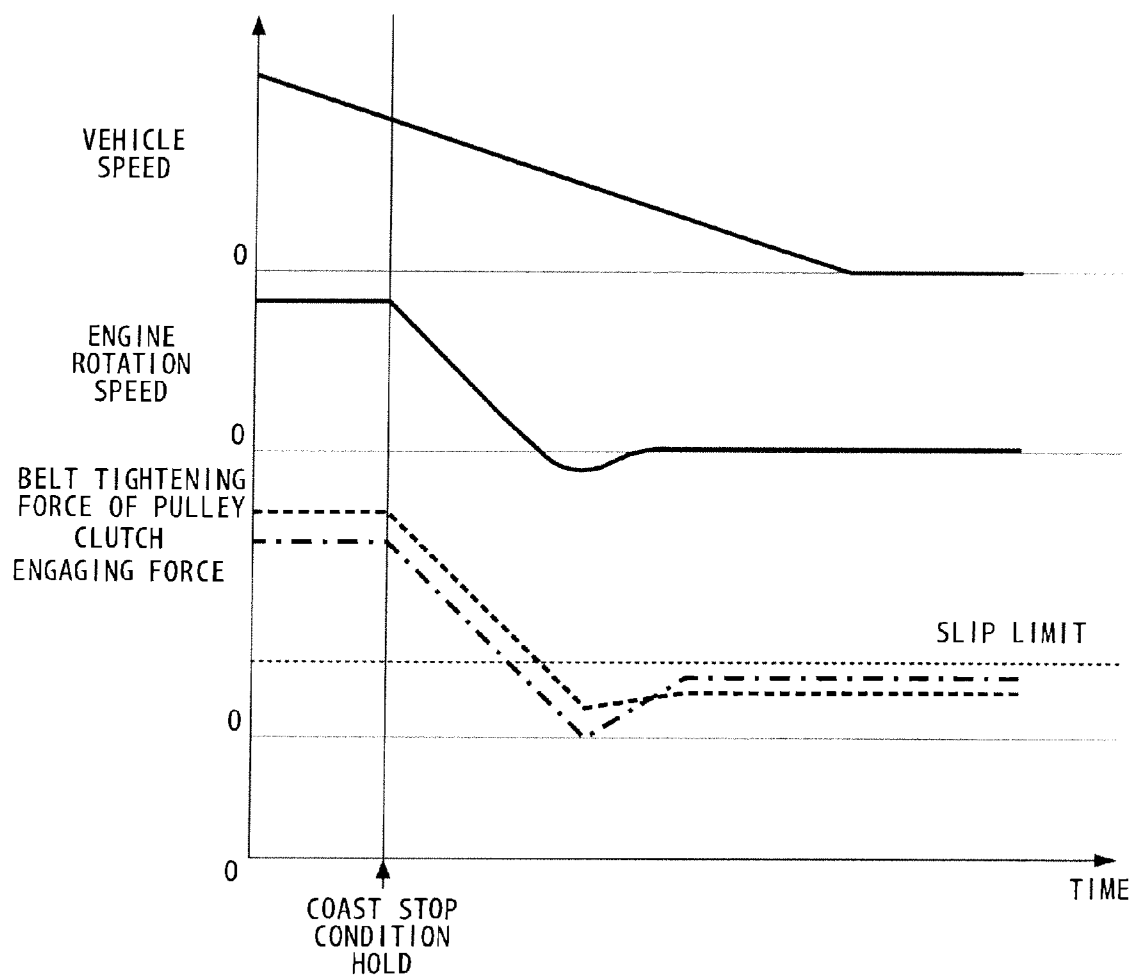
FIG. 7 is a graph showing states of the variator and the sub-transmission mechanism at the time of the coast stop according to the first embodiment of the present invention.

FIG. 7 is a graph showing another example of the states of the variator 20 and the sub-transmission mechanism 30 at the time of the coast stop in this embodiment.

As described above with reference to FIG. 5, the coast stop is executed and the rotational speed of the engine 1 is reduced to reduce the discharge pressure of the mechanical oil pump 10*m* and also reduce the line pressure. This causes the belt tightening force of the pulleys and the clutch engaging force to be respectively reduced.

Here, the clutch engaging force of a certain frictional engagement element (e.g. low brake 32) may be more than the belt tightening force of the pulleys due to respective characteristics of the variator 20 and the frictional engagement element. In such a case, the hydraulic pressure is so controlled by the controller 12 during a normal operation that the belt tightening force of the pulleys is constantly more than the clutch engaging force.

On the other hand, if the coast stop is executed when the frictional engagement element is engaged, a control margin by the controller 12 decreases due to a reduction in the line pressure. In this case, the belt tightening force of the pulleys and the clutch engaging force are in an area equal to or below a slip limit (shown by dotted line) when the line pressure becomes lower than a certain predetermined value and, at this time, the clutch engaging force is more than the belt tightening force of the pulleys. Thus, the tightening force of the V-belt 23 falls below the engaging force of the frictional engagement element and the V-belt 23 may possibly slip.

As just described, due to reductions in the discharge pressure of the mechanical oil pump 10*m* and the line pressure caused by the execution of the coast stop and a resulting reduction in the rotational speed of the engine 1 when a certain frictional engagement element (for example, low brake 32) is in an engaged state, there is a possibility that the belt tightening force of the pulleys falls below the clutch engaging force and the V-belt 23 slips.

Accordingly, in this embodiment, the controller 12 executes the following control to prevent slip of the V-belt 23 caused by such a situation.

Figure 8:
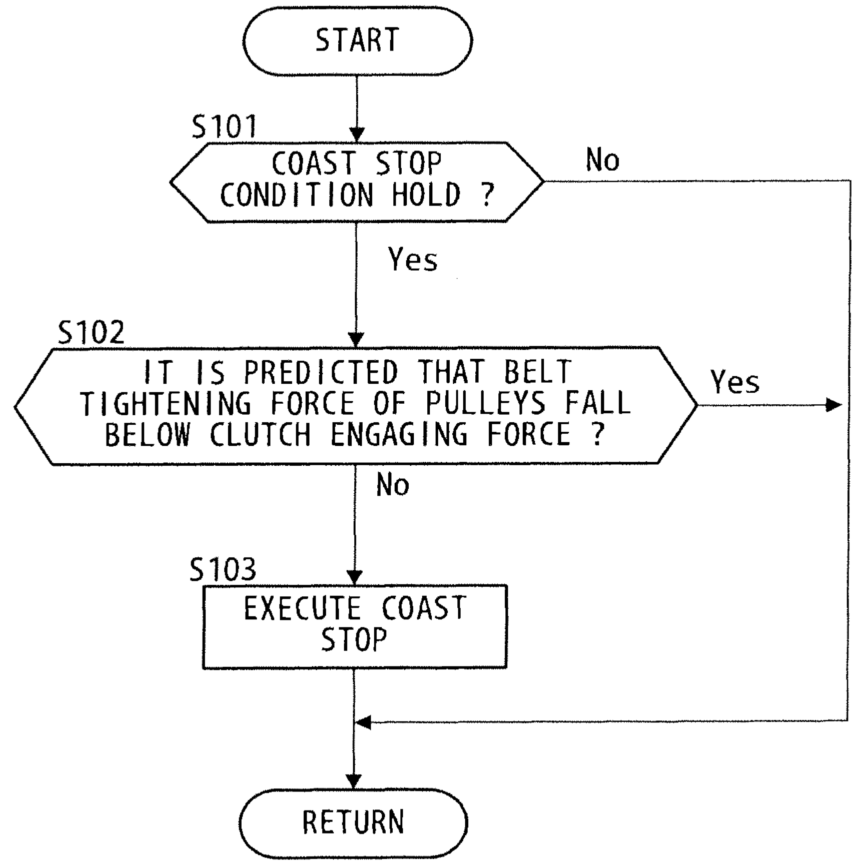
FIG. 8 is a flow chart of a controller according to the first embodiment of the present invention.

FIG. 8 is a flow chart for determination of the execution of the coast stop by the controller 12 according to this embodiment. Note that a process of this flow chart is performed at a specified time interval (10 ms) in the controller 12.

The controller 12 determines from the present driving condition of the vehicle whether or not the coast stop condition holds (Step S101).

The coast stop condition holds, for example, when the accelerator pedal is not depressed at all, the brake pedal is depressed, the vehicle speed is the predetermined low vehicle speed or lower and the lock-up clutch is released as described above.

The process by this flow chart is ended and the coast stop is not executed when the coast stop condition is determined not to hold.

If the coast stop condition is determined to hold, the controller 12 determines whether or not the present states of the variator 20 and the sub-transmission mechanism 30 are states predicted to cause the belt tightening force of the pulleys to fall below the clutch engaging force by the execution of the coast stop (Step S102).

More specifically, as described above with reference to FIG. 6, if the accumulator 60 is provided in the oil passage 56 for supplying the hydraulic pressure to the frictional engagement element, states predicted to cause the belt tightening force of the pulleys to fall below the clutch engaging force by the execution of the coast stop are determined when the frictional engagement element (e.g. low brake 32) is in the engaged state before the execution of the coast stop and the frictional engagement element needs to be released by the execution of the coast stop.

Further, as described above with reference to FIG. 7, states predicted to cause the belt tightening force of the pulleys to fall below the clutch engaging force in the area equal to or below the slip limit by the execution of the coast stop are determined when the clutch engaging force of the frictional engagement element is more than the belt tightening force of the pulleys, the frictional engagement element (e.g. low brake 32) is in the engaged state before the execution of the coast stop and the frictional engagement element needs to be released by the execution of the coast stop.

In this way, when the controller 12 determines that a certain specific frictional engagement element (e.g. low brake 32) is in the engaged state and the sub-transmission mechanism 30 is in a gear position (e.g. first gear position) realized by the engagement of this frictional engagement element, it is predicted that the belt tightening force of the pulleys falls below the clutch engaging force and it is determined not to execute the coast stop regardless of whether or not the coast stop condition holds.

In Step S102, the controller 12 ends the process by the flow chart and does not execute the coast stop when it is determined not to execute the coast stop.

On the other hand, the controller 12 executes the coast stop (Step S103) when it is not predicted that the belt tightening force of the pulleys falls below the clutch engaging force by the execution of the coast stop (e.g. second gear position in which the high clutch 33 is engaged).

As a result, when the sub-transmission mechanism 30 is in such a gear position (e.g. first gear position) that a certain frictional engagement element (e.g. low brake 32) is in the engaged state, the coast stop is not executed to prevent slip of the V-belt 23 in the variator 20 even when the coast stop condition holds.

Here, the belt tightening force of the pulleys used in the first embodiment of the present invention is a belt tightening force of the secondary pulley 22. This is because a pressure receiving area of the hydraulic cylinder 23*b* of the secondary pulley 22 is set to be smaller than that of the hydraulic cylinder 23*a* of the primary pulley 21. If the same hydraulic pressure is supplied to the both pulleys, the tightening force of the secondary pulley 22 becomes smaller than that of the primary pulley 21 and a slip occurs at the secondary pulley 22. Accordingly, if the clutch engaging force is less than the belt tightening force of the secondary pulley 22, no slip occurs at the primary pulley 21 and the secondary pulley 22. Note that the belt tightening force of the pulleys is the belt tightening force of the primary pulley 21 if the pressure receiving area of the hydraulic cylinder 23*b* of the secondary pulley 22 is set to be larger than that of the hydraulic cylinder 23*a* of the primary pulley 21.

As described above, the first embodiment of the present invention relates to the coast stop vehicle capable of enlarging an area where fuel of the engine 1 can be reduced and improving fuel efficiency by stopping the engine during travel by the coast stop in the continuously variable transmission including the continuously variable transmission mechanism (variator) 20 and the sub-transmission mechanism 30 having a plurality of gear positions and capable of enlarging a shift area.

In the determination as to whether or not to execute the coast stop, the coast stop is not executed when the belt tightening force of the pulleys is estimated to fall below the clutch engaging force of the engaged frictional engagement element (e.g. low brake 32) due to a reduction in the line pressure caused by a reduction in the rotation of the engine 1 and a resulting reduction in the rotation of the mechanical oil pump 10*m*. This can prevent the occurrence of a trouble such as the deterioration of the sheave surface of the primary pulley 21 or the secondary pulley 22 or the deterioration of the V-belt 23 itself caused by slip of the V-belt 23.

Further, the engaging force of the engaged frictional engagement element can be reduced by releasing the engaged frictional engagement element (e.g. low brake 32) upon executing the coast stop, whereby it can be suppressed that the engaging force of the frictional engagement element exceeds the belt tightening force of the pulleys.

The coast stop is not executed under a condition that the frictional engagement element (low brake 32) for which the accumulator 60 is provided in the oil passage 56 for the purpose of easing an engaging/releasing shock is in the engaged state and the sub-transmission mechanism 30 is in a predetermined gear position (first gear position) because this frictional engagement element is in the engaged state. This can combine prevention of slip of the V-belt 23 and improvement in the fuel efficiency (in the second gear position when the high clutch 33 is engaged) in the case of executing the coast stop.

Second Embodiment

Next, a second embodiment of the present invention is described. In the second embodiment, a hydraulic control circuit 11 differs in construction from the first embodiment. Note that a basic construction (FIGS. 1 to 3) of the second embodiment is the same as that of the first embodiment and not described.

Figure 9:
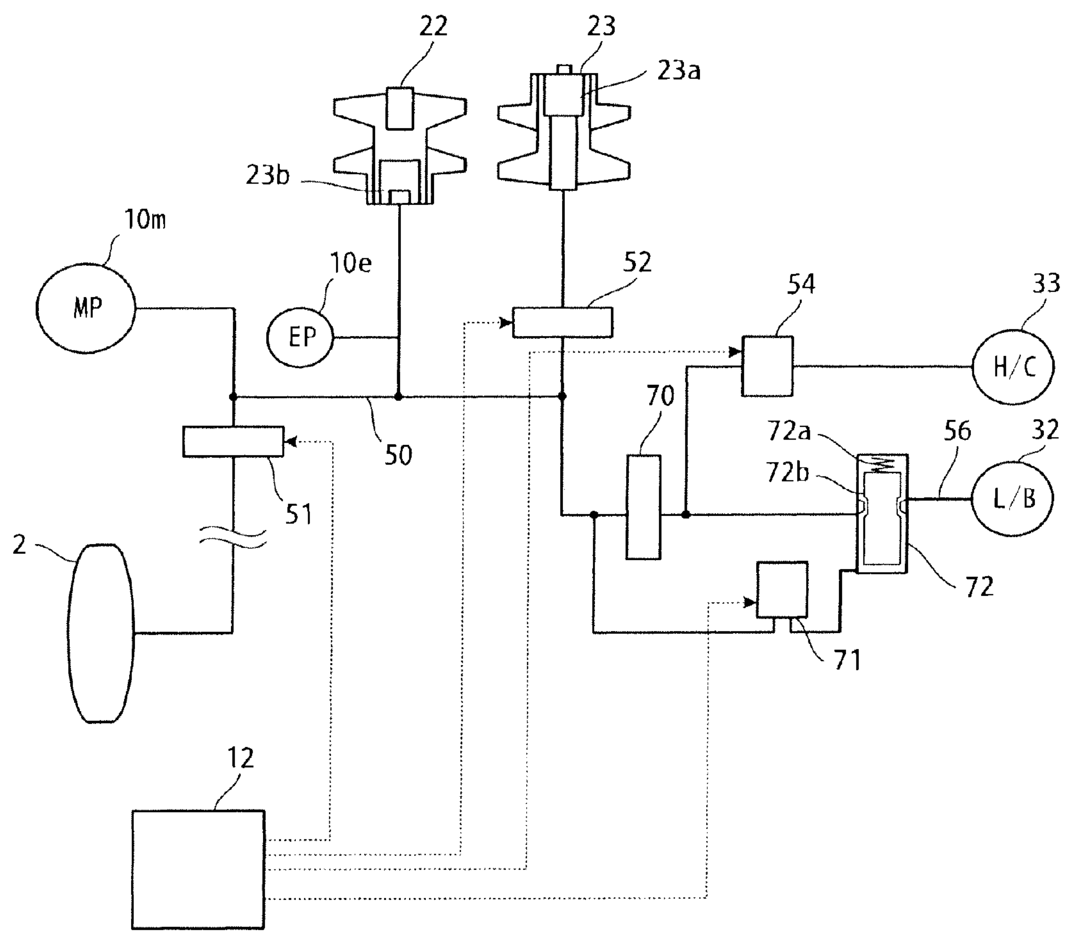
FIG. 9 is a diagram of a hydraulic control circuit according to a second embodiment of the present invention.

FIG. 9 is a diagram showing the construction of the hydraulic control circuit 11 according to the second embodiment of the present invention.

The hydraulic control circuit 11 includes a mechanical oil pump 10*m* driven by drive power of an engine 1. A hydraulic pressure produced by the mechanical oil pump 10*m* is adjusted to a predetermined line pressure by a pressure regulator valve 51 and distributed to respective components of a variator 20 and a sub-transmission mechanism 30 via an oil passage 50.

In the variator 20, the line pressure is supplied to an oil chamber of a hydraulic cylinder 23*b* of a secondary pulley 22 as in the above first embodiment. Further, the line pressure in the oil passage 50 is reduced by a pressure reducing valve 52 and supplied to an oil chamber of a hydraulic cylinder 23*a* of a primary pulley 21.

Further, in the sub-transmission mechanism 30, the line pressure in the oil passage 50 is distributed to a high clutch 33 and a low brake 32 via a manual valve 70. The manual valve 70 supplies the line pressure to the low brake 32 and the high clutch 33 in a drive position and limits the supply of the line pressure and releases the clutches in a neutral or parking position in response to a select lever.

The line pressure via the manual valve 70 is supplied to the high clutch 33 via a pressure reducing valve 54. Further, the line pressure is supplied to the low brake 32 via a pressure control valve 72.

The pressure control valve 72 is for adjusting the supplied line pressure by a hydraulic pressure adjusted by a pressure reducing valve 71 and outputting it to the low brake 32.

A spool 72*b* of the pressure control valve 72 is biased in one direction by a spring 72*a*. In this state, an oil passage leading to the oil passage 50 and an oil passage 56 at the side of the low brake 32 communicate and the line pressure is directly output to the low brake 32.

Further, the hydraulic pressure adjusted by the pressure reducing valve 71 is input to the pressure control valve 72. This hydraulic pressure acts to push up the spool 72*b* against a biasing force of the spring 72*a*. The pressure reducing valve 71 includes a solenoid and the hydraulic pressure output by the pressure reducing valve 71 is controlled through a duty control by a controller 12. By inputting this hydraulic pressure to the pressure control valve 72, the spool 72*b* is moved upward to change a valve opening of the pressure control valve 72, whereby the hydraulic pressure supplied to the low brake 32 can be controlled.

In the above first embodiment, the hydraulic pressure supplied to the low brake 32 is controlled by the pressure reducing valve 53. Further, the hydraulic pressure supplied to the high clutch 33 is controlled by the pressure reducing valve 54. These include a solenoid and the hydraulic pressures to be output are controlled through a duty control by the controller 12.

In the case of controlling the solenoids by power in this way, such a failure as to cut off electrically conductive states of the solenoids may occur due to noise, a contact failure or the like. If such a failure occurs, a hydraulic control by the solenoids is disabled and the frictional engagement elements cannot be engaged since no hydraulic pressure is supplied thereto. In such a situation, drive power from the engine 1 cannot be transmitted to drive wheels and there is a possibility of disabling the travel of the vehicle.

In this embodiment, as just described, the pressure control valve 72, the physical valve opening of which is controlled by the hydraulic pressure controlled by the solenoid, is provided at the side of the low brake 32 instead of directly controlling the hydraulic pressure of the frictional engagement element by the solenoid for a fail-safe for preventing a situation where the vehicle cannot drive due to a failure of the solenoid and maintaining the frictional engagement element in the engaged state.

The solenoid of the pressure reducing valve 71 for supplying the hydraulic pressure to control the opening of this pressure control valve 72 is constructed to be normally low, zero the hydraulic pressure when a current signal is off and maximize the hydraulic pressure when the current signal has a maximum value.

Here, if a failure to cut off the electrically conductive state of the pressure reducing valve 71 occurs, the hydraulic pressure of the normally low pressure reducing valve 71 becomes zero. This causes the spool 72*b* of the pressure control valve 72 to be pushed down by the biasing force of the spring 72*a* and causes the oil passage leading to the oil passage 50 and the oil passage 56 at the side of the low brake 32 to communicate. This causes the line pressure to be directly supplied to the low brake 32 and causes the low brake 32 to be engaged.

Accordingly, even if a failure occurs in the pressure reducing valve 71 controlled by a current and the hydraulic pressure cannot be controlled any longer, the line pressure can be supplied to the low brake 32, the low brake 32 can be engaged and, at the very least, the drive power of the engine 1 can be transmitted to the drive wheels.

A fail-safe is realized by constructing hydraulic circuits having opposite characteristics by the pressure control valve 72 and the pressure reducing valve 71, i.e. making a control hydraulic pressure of the low brake 32 by the pressure control valve 72 opposite to an output hydraulic pressure from the pressure reducing valve 71.

The following problem could occur when the coast stop is executed in the thus constructed hydraulic control circuit 11 of this embodiment.

Figure 10:
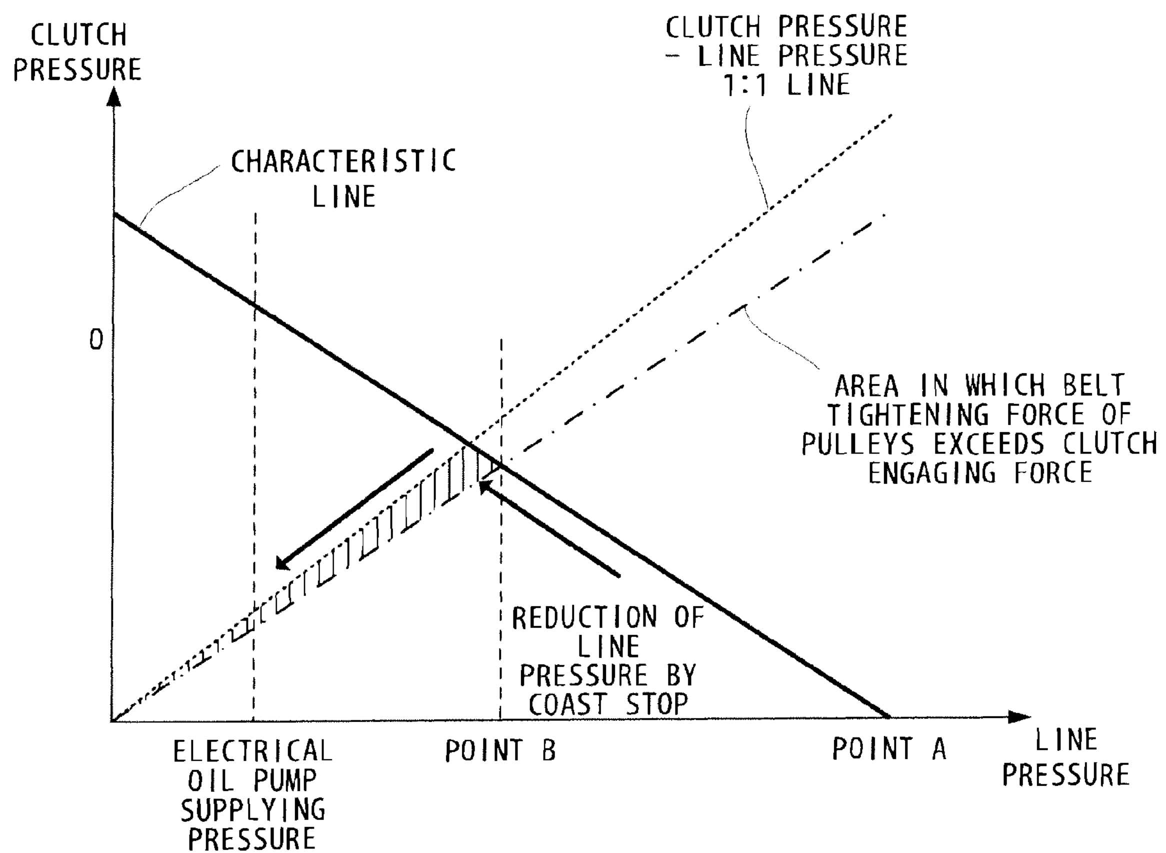
FIG. 10 is a graph showing a relationship between a line pressure and a clutch pressure according to the second embodiment of the present invention.

FIG. 10 is a graph showing a relationship between the line pressure and the hydraulic pressure (clutch pressure) output from the pressure control valve 72 in the hydraulic control circuit 11 according to the second embodiment.

Note that the hydraulic pressure output from the pressure control valve 72 to the low brake 32 is called a "clutch pressure" here.

In the pressure control valve 72, the clutch pressure is controlled by the pressure reducing valve 71 using the line pressure as a source pressure. The clutch pressure output from the pressure control valve 72 has an opposite characteristic to the line pressure. The clutch pressure can be controlled to be 0 [MPa] if the line pressure is a predetermined value or higher, but a lower limit value of the clutch pressure controllable by the line pressure increases along a characteristic line in FIG. 10 if the line pressure is below the predetermined value. Note that the predetermined value of the line pressure which can control the clutch pressure to be 0 is called a "point A" here.

If the line pressure is higher than the point A, the pressure control valve 72 can control the clutch pressure between 0 and a line at which the clutch pressure and the line pressure are 1:1 (line pressure-clutch pressure 1:1 line).

Here, as described above, the coast stop is executed and the rotational speed of the engine 1 is reduced, whereby the discharge pressure of the mechanical oil pump 10*m* is reduced and the line pressure is also reduced. Thereafter, the line pressure is reduced to become equal to the hydraulic pressure output by the electrical oil pump 10*e*.

At this time, as described above in the first embodiment, the V-belt 23 slips unless the belt tightening force of the pulleys in the variator 20 exceeds the clutch engaging force of the engaged frictional engagement element (here, low brake 32).

Since the line pressure is directly input to the hydraulic cylinder 23*b* of the secondary pulley 22, the belt tightening force of the pulleys has a value substantially equal to or slightly smaller than the line pressure.

On the other hand, the clutch pressure output from the pressure control valve 72 is input to the low brake 32. In order for the belt tightening force of the pulleys to exceed the clutch engaging force, the clutch pressure needs to be controlled to be lower than the line pressure. In FIG. 10, the clutch pressure needs to be controlled to be in an area below a dashed-dotted line of FIG. 10 in order for the belt tightening force of the pulleys to exceed the clutch engaging force.

However, if the line pressure is reduced to a certain pressure, it cannot overcome the biasing force of the spring 72*a* of the pressure control valve 72 and cannot push up the spool 72*b*, which results in a situation where the oil passage 50 communicates with the oil passage at the side of the low brake 32 and the line pressure is directly input as the clutch pressure.

In FIG. 10, a hydraulic pressure at which the spool 72*b* of the pressure control valve 72 cannot be moved by the line pressure is indicated as a point B. If the line pressure falls below the point B, it becomes equal to the clutch pressure and the clutch engaging force by the clutch pressure exceeds the belt tightening force of the pulleys. In such a situation, slip of the V-belt 23 may possibly occur.

Accordingly, in this embodiment, the control is performed not to execute the coast stop when the sub-transmission mechanism 30 is in such a gear position (e.g. first gear position) that the frictional engagement element (e.g. low brake 32), the clutch pressure of which is adjusted by the pressure control valve 72 having the opposite characteristic, is in the engaged state and the frictional engagement element needs to be released by execution of the coast stop.

Specifically, in Step S102 of FIG. 8 of the first embodiment, states predicted to cause the belt tightening force of the pulleys to fall below the clutch engaging force by the execution of the coast stop are determined when the frictional engagement element, the clutch pressure of which is controlled by the pressure control valve 72 having the opposite characteristic, is in the engaged state and the frictional engagement element needs to be released by the execution of the coast stop.

The controller 12 ends the process by this flow chart and does not execute the coast stop in the case of the states predicted to cause the belt tightening force of the pulleys to fall below the clutch engaging force by the execution of the coast stop.

By controlling in this way, the coast stop is not executed to prevent slip of the V-belt 23 in the variator 20. This can prevent the deterioration of the sheave surface of the primary pulley 21 or the secondary pulley 22 and that of the V-belt 23 caused by slip of the V-belt 23.

Here, the belt tightening force of the pulleys used in the second embodiment of the present invention is also the belt tightening force of the secondary pulley 22 for the same reason given in the first embodiment.

As described above, the second embodiment of the present invention relates to the coast stop vehicle capable of enlarging an area where fuel of the engine 1 can be reduced and improving fuel efficiency by stopping the engine during travel by the coast stop in the continuously variable transmission including the continuously variable transmission mechanism (variator) 20 and the sub-transmission mechanism 30 having a plurality of gear positions and capable of enlarging a shift area.

Similar to the first embodiment, the coast stop control is not executed when the belt tightening force of the pulleys for the V-belt 23 is estimated to fall below the clutch engaging force of the engaged frictional engagement element (e.g. low brake 32).

More specifically, the coast stop is not executed under a condition that the frictional engagement element (low brake 32), the engaging force or the engaged state of which is controlled by adjusting the line pressure by the pressure control valve 72 whose valve opening is adjusted by the control pressure adjusted by the pressure reducing valve 71 (corresponding to a solenoid valve of claim 4), is in the engaged state and the sub-transmission mechanism 30 is in the predetermined gear position (first gear position) because this frictional engagement element is in the engaged state. This can combine prevention of slip of the V-belt 23 and improvement in the fuel efficiency in the case of executing the coast stop (in the second gear position when the high clutch 33 is engaged).

The embodiments of the present invention have been described above. The above embodiments are merely illustration of application examples of the present invention and not of the nature to limit the technical scope of the present invention to specific constructions of the above embodiments.

Note that although the electrical oil pump 10*e* is provided to ensure the line pressure at the time of the coast stop in the above embodiments, the electrical oil pump 10*e* may not be necessarily provided. Even if the electrical oil pump 10*e* is not provided, the hydraulic pressure supplied from the mechanical oil pump 10*m* is not immediately reduced even when the mechanical oil pump 10*m* stops operating and the supply of the hydraulic pressure to the frictional engagement element and the pulleys is stopped due to the coast stop. Thus, the line pressure for the engaging force of the frictional engagement element and the belt tightening force can be ensured for a predetermined time after the stop of the engine 1 is started. Therefore, the engine can be stopped a predetermined time before the vehicle speed becomes zero and fuel economy can be improved.

Note that, in the construction including the electrical oil pump 10*e*, the hydraulic pressure can be produced and the line pressure for the engaging force of the frictional engagement element and the belt tightening force can be ensured as described above even after the mechanical oil pump 10*m* is stopped. Thus, a period during which the engine 1 can be stopped by the coast stop can be further extended and fuel economy can be more improved as compared to the construction not including the electrical oil pump 10*e*.

Although the V-belt continuously variable transmission mechanism is provided as the variator 20 in the above embodiments, the variator 20 may be a continuously variable transmission mechanism in which a chain is mounted between the pulleys 21 and 22 instead of the V-belt 23. Alternatively, the variator 20 may be a toroidal continuously variable transmission mechanism in which an inclinable power roller is arranged between an input disk and an output disk.

Although the sub-transmission mechanism 30 is provided behind the variator 20 in the above embodiments, it may be provided before the variator 20, i.e. between the torque converter 2 and the variator 20.

Although the sub-transmission mechanism 30 is a transmission mechanism with two first and second gear positions as forward gear positions, it may be a transmission mechanism with three or more forward gear positions. Also when the sub-transmission mechanism 30 has three or more forward gear positions, a control can be performed not to execute the coast stop in the gear position when the belt tightening force of the pulleys is supposed to fall below the engaging force of the frictional engagement element for realizing one gear position at the time of a reduction in line pressure associated with the coast stop.

Although the low brake 32 is made fail-safe by the pressure control valve 72 having the opposite characteristic in the second embodiment, what is made fail-safe needs not be necessarily the low brake 32. Out of the frictional engagement elements of the sub-transmission mechanism 30, one frictional engagement element may be made fail-safe by such a pressure control valve 72. For example, a pressure control valve having a positive characteristic and controlled by a hydraulic pressure by a pressure reducing valve with a normally high solenoid may be provided for the high clutch 33, and the high clutch 33 may be made fail-safe by this.

Although the sub-transmission mechanism 30 is constructed using the Ravigneaux-type planetary gear mechanism, it is not limited to such a construction. For example, the sub-transmission mechanism 30 may be constructed by combining a normal planetary gear mechanism and frictional engagement elements or may be constructed by a plurality of power transmission paths including a plurality of gear trains with different gear ratios and frictional engagement elements for switching these power transmission paths.

Although the hydraulic cylinders 23*a*, 23*b* are provided as actuators for displacing the movable conical plates of the pulleys 21, 22 in the axial directions, the actuators may be electrically driven ones without being limited to hydraulically driven ones.

This application claims priority from Japanese Patent Application No. 2010-227021, filed Oct. 6, 2010, which is incorporated herein by reference in its entirety.

What is claimed is:

1. A coast stop vehicle for stopping a drive power source during a travel of the vehicle, comprising:

an oil pump which produces a line pressure in an oil passage by a rotation of the drive power source;

a variator which continuously changes a speed ratio by changing a winding diameter of a belt mounted on pulleys using the line pressure;

a sub-transmission mechanism connected in series with the variator, and wherein the sub-transmission mechanism shifts discrete gear positions by changing engaged states of a plurality of frictional engagement elements using the line pressure; and a coast stop unit which determines whether or not a coast stop condition holds during the travel of the vehicle and which executes a coast stop to stop the rotation of the drive power source when the coast stop condition holds, wherein the coast stop unit includes a coast stop prohibiting unit which prohibits the coast stop when a prediction is made that, at a time of determining whether or not the coast stop condition holds, a belt tightening force of the pulley will fall below an engaging force of one of the plurality of frictional engagement elements in an engaged state by execution of the coast stop.

2. The coast stop vehicle according to claim 1, wherein the coast stop unit releases the one of the plurality of frictional engagement elements in the engaged state upon executing the coast stop.

3. The coast stop vehicle according to claim 1, wherein the one of the plurality of frictional engagement elements is one for which an accumulator is provided in the oil passage for supplying a hydraulic pressure, and the coast stop prohibiting unit prohibits the coast stop regardless of whether or not the coast stop condition holds when the one of the plurality of frictional engagement elements is in the engaged state.

4. The coast stop vehicle according to claim 1, further comprising:

a solenoid valve, and a pressure control valve whose valve opening is adjusted by a control pressure adjusted by the solenoid valve, wherein the coast stop prohibiting unit prohibits the coast stop regardless of whether or not the coast stop condition holds when the one of the plurality of frictional engagement elements, the engaged state of which is controlled by adjusting the line pressure by the pressure control valve, is in the engaged state at the time of determining whether or not the coast stop condition holds.

5. A coast stop method for a coast stop vehicle for stopping a drive power source during a travel of the vehicle, the vehicle including an oil pump for producing a line pressure by a rotation of the drive power source, a variator which continuously changes a speed ratio by changing a winding diameter of a belt mounted on a pair of pulleys using the line pressure, and a sub-transmission mechanism connected in series with the variator, the sub-transmission mechanism shifting stepped gear positions by changing engaged states of a plurality of frictional engagement elements using the line pressure, the method comprising:

determining whether or not a coast stop condition holds during the travel of the vehicle;

executing a coast stop by stopping the rotation of the drive power source and releasing an engaged one of the plurality of frictional engagement elements when the coast stop condition holds; and prohibiting the coast stop regardless of whether or not the coast stop condition holds when a prediction is made that a belt tightening force of the pulleys will fall below an engaging force of the one of the plurality of frictional engagement elements by the execution of the coast stop.

6. The coast stop method according to claim 5, wherein the one of the plurality of frictional engagement elements is one for which an accumulator is provided in an oil passage for supplying a hydraulic pressure, and the coast stop is prohibited regardless of whether or not the coast stop condition holds when the one of the plurality of frictional engagement elements is in an engaged state at a time of the determining whether or not the coast stop condition holds.

7. The coast stop method according to claim 5, the coast stop vehicle further comprising:

a solenoid valve, and a pressure control valve whose valve opening is adjusted by a control pressure adjusted by the solenoid valve, wherein the coast stop is prohibited regardless of whether or not the coast stop condition holds when the one of the plurality of frictional engagement elements, an engaged state of which is controlled by adjusting the line pressure by the pressure control valve, is in the engaged state at a time of the determining whether or not the coast stop condition holds.

8. A coast stop vehicle for stopping a drive power source during a travel of the vehicle, comprising:

an oil pump which produces a line pressure in an oil passage by a rotation of the drive power source;

a variator which continuously changes a speed ratio by changing a winding diameter of a belt mounted on pulleys using the line pressure;

a sub-transmission mechanism connected in series with the variator, the sub-transmission mechanism shifting discrete gear positions by changing engaged states of a plurality of frictional engagement elements using the line pressure; and coast stop means for determining whether or not a coast stop condition holds during the travel of the vehicle and for executing a coast stop to stop the rotation of the drive power source when the coast stop condition holds, the coast stop means including coast stop prohibiting means for prohibiting the coast stop when a prediction is made that, at a time of determining whether or not the coast stop condition holds, a belt tightening force of the pulley will fall below an engaging force of one of the plurality of frictional engagement elements in an engaged state by execution of the coast stop.

9. The coast stop vehicle according to claim 8, wherein the coast stop means releases the one of the plurality of frictional engagement elements in the engaged state upon executing the coast stop.

10. The coast stop vehicle according to claim 8, wherein the one of the plurality of frictional engagement elements is one for which an accumulator is provided in the oil passage for supplying a hydraulic pressure, and the coast stop prohibiting means prohibits the coast stop regardless of whether or not the coast stop condition holds when the one of the plurality of frictional engagement elements is in the engaged state.

11. The coast stop vehicle according to claim 8, further comprising:

a solenoid valve, and a pressure control valve whose valve opening is adjusted by a control pressure adjusted by the solenoid valve, wherein the coast stop prohibiting means prohibits the coast stop regardless of whether or not the coast stop condition holds when the one of the plurality of frictional engagement elements, the engaged state of which is controlled by adjusting the line pressure by the pressure control valve, is in the engaged state at the time of determining whether or not the coast stop condition holds.

* * * * *